(12) United States Patent
Li et al.

(10) Patent No.: US 12,135,112 B2
(45) Date of Patent: Nov. 5, 2024

(54) SYSTEM HAVING CRYOTANK WITH OFFSET PUMP HOUSING, METHOD OF MAKING AND METHOD OF USING THE SAME

(71) Applicants: China Energy Investment Corporation Limited, Beijing (CN); National Institute of Clean-and-Low-Carbon Energy, Beijing (CN)

(72) Inventors: Xianming Li, Orefield, PA (US); Anthony Ku, Fremont, CA (US)

(73) Assignees: China Energy Investment Corporation Limited, Beijing (CN); National Institute of Clean-And-Low-Carbon Energy, Beijing (CN)

( * ) Notice: Subject to any disclaimer, the term of this patent is extended or adjusted under 35 U.S.C. 154(b) by 292 days.

(21) Appl. No.: 17/685,799

(22) Filed: Mar. 3, 2022

(65) Prior Publication Data

US 2023/0073960 A1 Mar. 9, 2023

Related U.S. Application Data

(60) Provisional application No. 63/240,659, filed on Sep. 3, 2021.

(51) Int. Cl.
*F17C 13/00* (2006.01)
*F17C 1/12* (2006.01)
*F17C 7/02* (2006.01)

(52) U.S. Cl.
CPC .............. *F17C 13/006* (2013.01); *F17C 1/12* (2013.01); *F17C 7/02* (2013.01);
(Continued)

(58) Field of Classification Search
CPC .. F17C 13/006; F17C 9/00; F17C 1/12; F17C 7/02; F17C 2201/0109; F17C 2201/035;
(Continued)

(56) References Cited

U.S. PATENT DOCUMENTS 3,451,342 A * 6/1969 Schwartzman ......... F01K 25/10
60/641.1
6,474,078 B2 11/2002 Chalk et al.
(Continued)

FOREIGN PATENT DOCUMENTS

CN 203743819 U 7/2014
WO WO-2020182294 A1 * 9/2020

OTHER PUBLICATIONS

Pdf is original document of foreign reference WO 2020182294 A1 (Year: 2020).*

*Primary Examiner* — Henry T Crenshaw
*Assistant Examiner* — Kamran Tavakoldavani
(74) *Attorney, Agent, or Firm* — Calfee, Halter & Griswold LLP (57) ABSTRACT

A system and a method for liquefied fuel storage are provided. The system includes a first module including a first outer vessel wall and a cryotank, a second module including a second outer vessel wall and a submerged pump at partially inside the second outer vessel wall, and a third module including a third outer vessel wall. The first, the second, and the third outer vessel walls are connected to provide an enclosure as an outer vessel.

20 Claims, 6 Drawing Sheets

(52) U.S. Cl.
CPC ........... *F17C 2201/0109* (2013.01); *F17C 2201/035* (2013.01); *F17C 2203/0391* (2013.01); *F17C 2205/0149* (2013.01); *F17C 2205/0323* (2013.01); *F17C 2205/0352* (2013.01); *F17C 2209/22* (2013.01); *F17C 2221/012* (2013.01); *F17C 2223/0161* (2013.01); *F17C 2227/0142* (2013.01); *F17C 2270/0168* (2013.01); *F17C 2270/0184* (2013.01)

(58) Field of Classification Search
CPC .......... F17C 2201/054; F17C 2201/056; F17C 2203/0391; F17C 2203/0629; F17C 2205/0111; F17C 2205/0149; F17C 2205/0323; F17C 2205/0335; F17C 2205/0352; F17C 2209/22; F17C 2221/012; F17C 2223/0161; F17C 2223/033; F17C 2223/046; F17C 2227/0135; F17C 2227/0142; F17C 2227/015; F17C 2260/031; F17C 265/066; F17C 2270/0168; F17C 2270/0184

See application file for complete search history.

(56) References Cited

U.S. PATENT DOCUMENTS

| | | | |
|---|---|---|---|
| 2010/0236259 A1* | 9/2010 | Brunner | F17C 1/00 62/48.1 |
| 2015/0217987 A1 | 8/2015 | Emmer et al. | |
| 2020/0158288 A1 | 5/2020 | Li et al. | |
| 2020/0200326 A1* | 6/2020 | Aceves | F17C 3/08 |
| 2020/0240379 A1 | 7/2020 | Kratschmar et al. | |
| 2022/0136656 A1* | 5/2022 | Clarke | F17C 13/002 220/560.12 |

* cited by examiner

SYSTEM HAVING CRYOTANK WITH OFFSET PUMP HOUSING, METHOD OF MAKING AND METHOD OF USING THE SAME

PRIORITY CLAIM AND CROSS-REFERENCE

This application claims the benefit of U.S. Provisional Application No. 63/240,569, filed Sep. 3, 2021, which application is expressly incorporated by reference herein in its entirety.

FIELD

The disclosure relates to system and methods for storing, transferring or dispensing a liquefied gas or fuel generally. More particularly, the disclosed subject matter relates to a system and a method for storing and/or pumping a liquefied fuel such as liquid hydrogen, and a method for forming such a system.

BACKGROUND

Most motor vehicles are currently powered by internal combustion engines with fossil fuels. Due to limited supply and adverse environmental effects associated with burning petroleum-derived fuels, vehicles are now being developed that are powered by alternative environmentally friendly fuels like hydrogen. Fuel cells can be used to produce electric power for motor vehicles by electrochemically reacting hydrogen fuel with an oxidant such as air. Other hydrogen-powered vehicles can be powered by combustion of hydrogen. Fueling or refueling hydrogen to fuel cell vehicles (FCV) and other hydrogen-powered vehicles presents different challenges from adding petroleum-based fuels like gasoline into a vehicle.

Hydrogen refueling stations for fuel cell vehicles can store fuel as a gas or a liquid before it is dispensed to vehicles as compressed gaseous hydrogen. Liquefied gases or fuels such as liquid hydrogen can be stored in a cryogenic tank, which is thermally insulated from environment. However, heat leak into the tank causes liquefied gas to vaporize to generate "boil-off" vapor as the liquid absorbs the heat leak from the environment. Pressure inside the tank increases as the vapor continues to build up in it. Excess vapor must be vented through a relief valve to the environment to keep the tank under the pressure limit, causing loss of some liquefied fuel or gas.

A submerged pump in a cryogenic storage tank maintains a constant temperature at about the working fluid temperature even during intermittent operation. Not only does the constant temperature of the pump reduce thermal cycling and extend lifetime of the pump, but also allows fast restart and minimizes vaporization loss during the startup phase. But placement of the pump inside the storage tank and removal of the pump from the storage tank for maintenance pose challenges in minimizing heat leakage and isolation of the fluid. For example, without a proper isolation mechanism, the storage tank must be drained before pump removal, causing potentially the loss of the full content of the storage tank and financial, safety and environmental concerns.

SUMMARY

The present disclosure provides a system and a method for storage and dispensing of a liquefied gas or fuel, and a method of forming such a system. For example, the liquefied fuel comprises or is hydrogen, and the system is a system for storing and/or dispensing liquid hydrogen.

In accordance with some embodiments, a system comprises a first module, a second module, and a third module, which are integrated together. The first module comprises a first outer vessel wall and a cryotank. The cryotank is disposed inside the first outer vessel wall, is mechanically coupled with the first outer vessel wall, and is configured to store a liquefied fuel such as liquid hydrogen therein.

The second module comprises a second outer vessel wall and at least one pump at least partially disposed inside the second outer vessel wall. Each pump is fluidly coupled with the cryotank, which is configured to provide a first stream of the liquefied fuel to the pump. The pump is configured to accept a first stream of the liquefied fuel from the cryotank, compress the first stream of the liquefied fuel to an increased pressure, and pump it out (dispense it) as a second stream of the liquefied fuel. In some embodiments, each pump is a submerged liquid pump, and comprises a bottom portion as a liquid reservoir configured to accept the first stream of the liquefied fuel for cooling the pump and supplying the pump with the liquefied fuel.

The third module comprises a third outer vessel wall. The first, the second, and the third outer vessel walls are connected to provide an enclosure as an integrated outer vessel. The space between the outer vessel and an inner vessel such as the cryotank and the at least one pump is vacuumed and/or may be filled with insulation materials.

In some embodiments, the first module, the second module, and the third module are configured to be assembled along a longitudinal direction. The second module is disposed between the first module and the third module when the system is assembled. In some embodiments, the first module, the second module, and the third module are configured to be reversibly assembled and disassembled.

In some embodiments, the first module comprises a first supporting frame at a first end and connected with the first outer vessel wall. The cryotank is fixed onto the first supporting frame through a fixing support. The first module further comprises a second supporting frame on a second end and connected with the first outer vessel wall, a sleeve in the second supporting frame, and a sliding support connected with the first outer vessel wall. The sliding support is rested inside the sleeve and configured to slide inside the sleeve when the cryotank is subject to thermal expansion or shrinkage.

In some embodiments, the at least one pump comprises a piston, an intake port, and an isolation valve configured to supply the liquefied fuel to the intake port.

In some embodiments, the second module comprises: a first pipe fluidly connected to a vapor pump chamber and configured to hold vapor of the liquefied fuel in the pump chamber, and a second pipe fluidly connected to a first liquid pump chamber and configured to hold the liquefied fuel contacting a backside of the piston. The first module comprises at least one block valve fluidly connected to the first pipe, the second pipe, and a headspace of the cryotank. The first pipe, the second pipe and the block valve are configured to flow the vapor of the liquefied fuel in the pump chamber through the first pipe, and the liquefied fuel contacting the backside of the piston through the second pipe, to the headspace of the cryotank.

The second module further comprises a discharge line fluidly connected with the pump and configured to dispense the stream of the liquefied fuel out of the pump.

In some embodiments, the integrated outer vessel is fully sealed. The gap space inside the enclosure except the cryotank and the pump or other components is in vacuum.

In some embodiments, the liquefied fuel comprises hydrogen. The system is for storing liquid hydrogen and/or dispensing hydrogen. The system can be a part of a refueling station configured to dispense hydrogen as compressed gas into fuel cell vehicles.

In another aspect, the present disclosure also provides a method of forming the system as described herein. The method comprises providing the first module, and providing the second module, providing the third module. Each providing step may also include one or more steps for manufacturing each module or each component in each respective module. The method further comprises connecting the second module with the first module, and connecting the third module with the second module. The connecting the second module with the first module comprises connecting the first and the second outer vessel walls. The connecting the third module with the second module comprises connecting the third and the second outer vessel walls to provide the enclosure as the outer vessel. Each connecting step may include any suitable process such as welding, bonding, riveting, and other suitable methods.

In some embodiments, the first module, the second module, and the third module are configured to be assembled in a longitudinal direction. The second module is disposed between the first module and the third module when the system is assembled. In some embodiments, the first module, the second module, and the third module are configured to be reversibly assembled and disassembled.

In some embodiments, the first module comprises a first supporting frame at a first end and connected with the first outer vessel wall, a second supporting frame on a second end and connected with the first outer vessel wall, a sleeve in the second supporting frame, and a sliding support connected with the first outer vessel wall. The cryotank is fixed onto the first supporting frame through a fixing support. The sliding support is rested inside the sleeve and configured to slide inside the sleeve when the cryotank is subject to thermal expansion or shrinkage.

The at least one pump comprises a piston, an intake port, and an isolation valve configured to supply the liquefied fuel to the intake port. The method further comprises connecting a line from the cryotank to the intake port.

The method further comprises connecting a first pipe fluidly connected to a vapor pump chamber to a third pipe connected to a headspace of the cryotank, and connecting a second pipe fluidly connected to a first liquid pump chamber to the third pipe. The first pipe is configured to flow vapor of the liquefied fuel in the pump chamber to the headspace, and the second pipe is configured to flow the liquefied fuel contacting a backside of the piston to the cryotank.

After the system is fully assembled, the integrated outer vessel is fully sealed. The gap space inside the enclosure except the cryotank, the pump and other parts may be vacuumed.

In some embodiments, the liquefied fuel comprises or is hydrogen. The at least one pump comprises two or more submerged liquid pumps. The submerged pumps are cooled with the fuel from the cryotank and configured to compress and increase pressure of the first stream of the liquefied fuel to be pumped out.

In some embodiments, the system is disposed in a refueling station comprising a dispenser. The refueling station is configured to receive the second stream of the liquefied fuel from the cryotank and dispense it in a form of a gaseous fuel or liquid fuel such as compressed hydrogen gas to a receiving fuel tank such as an onboard fuel tank for a fuel cell vehicle.

In another aspect, the present disclosure also provides a method of using the system as described herein. For example, the system may comprise a controller configured to provide instructions and control the operation of the system.

The system and the method provided in the present disclosure provide many advantages as described herein. For example, in some embodiments, the present disclosure provides a system for hydrogen storage and refueling. The system in the present disclosure minimizes or eliminates losses of liquefied fuel such as hydrogen or has zero losses of hydrogen boil-off. The system with module design can be manufactured at reduced cost using readily available fabrication processes and tools.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Unless it is expressly stated otherwise, the term "substantially" such as in "substantially the same" used herein will be understood to encompass a parameter with a fluctuation in a suitable range, for example, with ±10% or ±15% fluctuation of the parameter. In some embodiments, the range of fluctuation is within ±10%.

Unless expressly indicated otherwise, a liquefied fuel such as hydrogen is stored in a storage tank, and pumped out using a pump in liquid form. It can be dispensed as a gaseous fuel or liquid fuel into a receiving tank in a vehicle. In the present disclosure, the terms "fueling" and "refueling" are used interchangeably.

As used herein, when an element or component is described as forming a "connected to," "coupled to," "coupled with" or "in contact with" another element or component, it can be directly connected to, directly coupled with, in direct contact with, or intervening elements or components may be connected, coupled or in contact with the particular element or component. When an element or component is referred to as being "directly connected to," "directly coupled to," "directly coupled with," or "directly in contact with" another element, there are no intervening elements or components.

As used herein, the terms "thermally coupled to" or "thermally coupled with" used herein will be understood that the components are coupled together directly or through an intervening component so that heat can be transferred among the components, and the components may be in direct contacted with each other or the intervening component contact the components. As used herein, the terms "fluidly coupled to" or "fluidly coupled with" used herein will be understood that the components are connected with pipes or lines and configured to have gas or liquid flow through the components. As used herein, the terms "electronically connected" or "electrically connected" used herein will be understood to encompass electrical connection using wires or wireless connection.

The terms "extension" and/or "extend" used herein will be understood to encompass a working mode of the cryopump, in which the piston including the piston rod is extending, and provides compression in the cryopump. The terms "retraction" and/or "retract" will be understood to encompass a different working mode of the cryopump, in which the piston including the piston rod is moving in suction stroke, which is in the opposite direction of extension. In some embodiments, the piston has a front surface facing an intake port. In the extension mode, the piston moves toward the intake port. In the retraction mode, the piston moves further away from the intake port.

A check valve as described herein is a one-way valve, which opens automatically in one direction only or is closed. An isolation valve as described herein is controllable to be open or closed. When the isolation valve is open, the liquefied fuel from the cryotank is admitted into the cryopump. A switching valve as described herein is controllable to be closed or to be open to flow a fluid in one direction only. A block valve as described herein is controllable to be closed or open so as to block or permit a fluid to move in one or more direction.

The term "ambient temperature" used herein will be understood as a temperature under ambient condition, for example, a room temperature of 20-25° C.

Submerged pumps for liquefied gas have many benefits such as fast startup, no cool-down boil-off loss, and low maintenance because there is no thermal cycling. But they require a special pump housing for installation. Such pump housing is a change in the existing cryotank design, and causes differences in manufacturing processes such as inner vessel insulation and vessel nesting. As a result, the cryotank becomes more expensive to fabricate. For example, if the pump is submerged inside a cryotank, it is very hard to install insulation around the cryotank, and it is also difficult to put a pump inside the cryotank or take the pump out if needed.

U.S. Pat. No. 6,474,078 discloses that it is costly to use a pump housing in a cryotank to accommodate a submerged pump, as empirical evidence from the industry later confirmed, so as to promote an external pump configuration.

However, the capital cost of a more expensive cryotank to house a submerged pump has to be balanced with the on-going cost of high liquid boil-off and slow startup of an external pump. In addition, improved cryotank and pump housing design can reduce the cost and make the submerged pump configuration even more attractive.

U.S. Patent Application Publication No. 2015/0217987 discloses a submerged pump housed inside a cryotank with an isolation valve to allow pump removal without draining the cryotank. The pump housing is integrated with the inner vessel of the cryotank. No provisions were disclosed to reduce the capital cost of cryotank manufacturing.

U.S. Patent Application Publication No. 2020/0240379 discloses an improved isolation valve with purging and venting means to safely isolate the submerged pump from the cryotank for removal and reinstallation.

This isolation valve can be used for a submerged pump, but the pump housing has a double-pipe design, which requires both an inner tube to house the pump and an outer pipe to connect with the inner vessel of the cryotank to create an isolated space for the pump. The annulus between the inner and outer pipes of the pump housing is connected with the cryotank vacuum space and the inner pipe is insulated with multi-layer insulation (MLI). This integrated pump housing with the inner vessel of the cryotank creates difficulty in manufacturing, particularly inner tank insulation and outer vessel nesting, therefore increasing the cost of cryotank manufacturing.

Chinese Patent Application CN 2037438190 discloses a design for an underground liquefied natural gas storage tank where a sump, a pump well, a submerged pump, and a one-way valve are used. The pump housing is separate from the inner vessel, which holds the liquefied natural gas (LNG) fluid. A conduit with a one-way valve connects the inner vessel and the pump well to allow LNG fluid into the pump well. The pump housing and the inner vessel with the LNG are encased in an outer vessel and the space between the inner and outer vessels are evacuated to establish a vacuum.

There are no descriptions of the submerged pump itself, nor how the pump housing can be isolated from the LNG for pump removal without draining the tank.

The present disclosure provides a system and a method for storing and dispensing a liquefied gas or fuel, and a method of forming such a system. For example, the liquefied fuel comprises or is hydrogen, and the system is a system for storing, dispensing, and/or using liquid hydrogen. In some embodiments, the system is a hydrogen refueling station for refueling hydrogen to fuel cell vehicles.

The present disclosure provides a method and a system to create a cryotank with an offset pump housing and a resulting system in a modular approach. The liquefied gas storage module is separate from the pump housing module so that regular manufacturing processes can be used. This method retains the benefits of the submerged pump without the added cost of cryotank fabrication with a special pump housing.

In some embodiments, the present disclosure provides a system. In accordance with some embodiments, three segments as described herein are used to separate the liquefied gas storage, the pump housing, and the closure so that the cryotank is fabricated in modules, each with readily available manufacturing processes. The pump housing has purging and venting features, as well as an isolation valve to allow pump removal without draining the liquefied gas. Support features to allow thermal contraction and module connections are disclosed.

The manufacturing cost of a cryotank with housing for a submerged pump is reduced without compromising the benefits of a submerged pump.

The novel modular design allows each module to be fabricated using regular processes yet with the full function of the submerge pump with an isolation valve.

Figure 1:
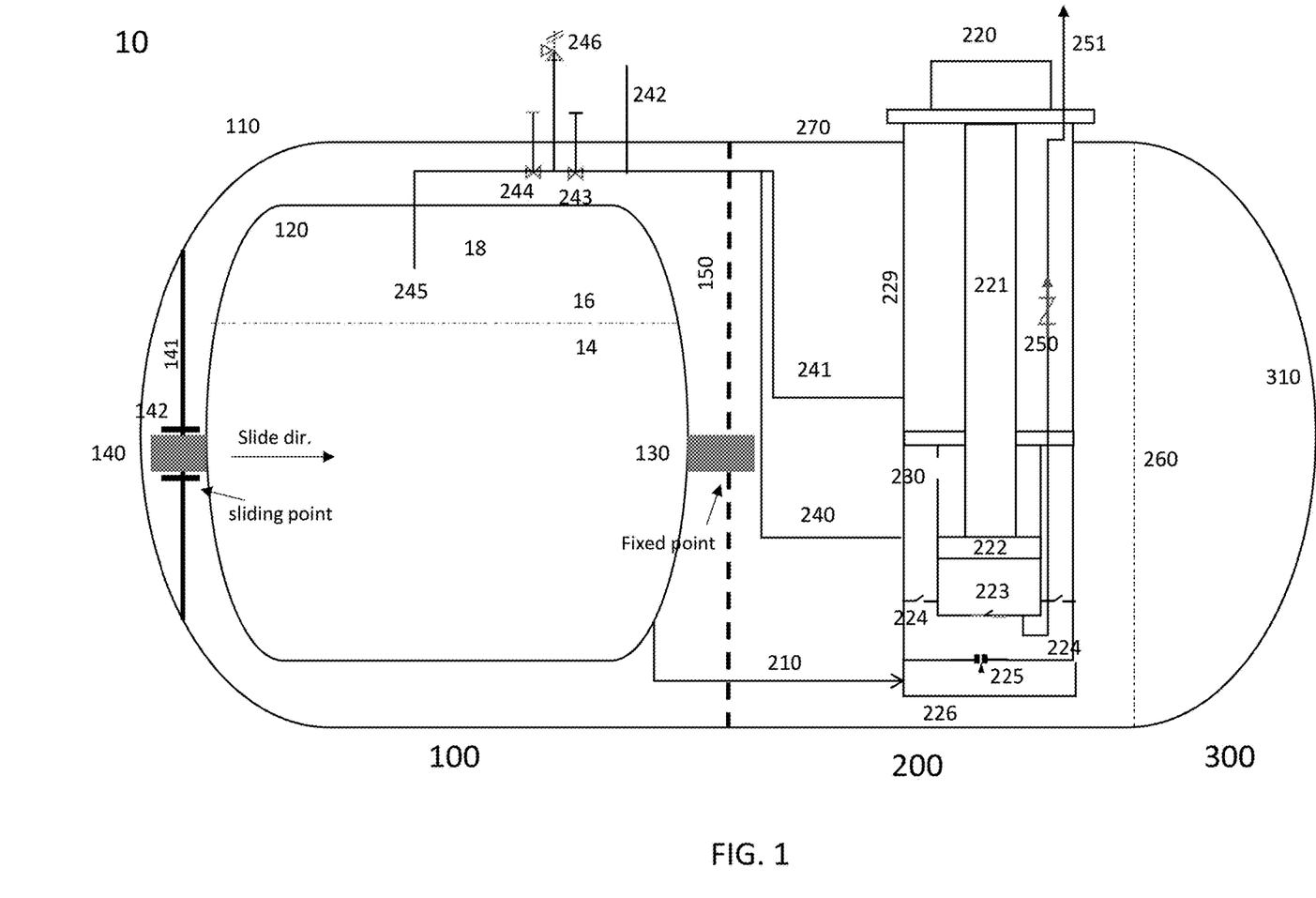
FIG. 1 is a cross sectional view illustrating an exemplary system in accordance with some embodiments. The cross section is vertical along a first direction (longitudinal direction) of the system according to some embodiments.

Referring to FIG. 1, the exemplary system 10 comprises a first module 100, a second module 200, and a third module 300, which are integrated together.

In some embodiments, the first module 100, the second module 200, and the third module 300 are configured to be assembled along a longitudinal direction. The second module 200 is disposed between the first module 100 and the third module 300 when the system 10 is assembled. In some embodiments, the first module 100, the second module 200, and the third module 300 are configured to be reversibly assembled and disassembled.

FIG. 1 illustrates an exemplary system 10 with a submerged pump 220. The cryotank with modular segment design with an offset pump housing is not drawn to the actual scale. FIG. 1 is for illustration only. The dimension of the modules can vary. For example, in some embodiments, the first module 100 including the cryotank 120 is much longer or wider than the second module 200 including the pump 220. In the system 10, the first module 100 is a liquefied gas storage module. The second module 200 is a pump housing module. The third module 300 is an enclosure module.

The first module 100 comprises a first outer vessel wall 110 and a cryotank 120. The first outer vessel wall 100 has one open end. The cryotank 120 is disposed inside the first outer vessel wall 110, is mechanically coupled with the first outer vessel wall 110, and is configured to store a liquefied fuel 14 such as liquid hydrogen therein. So the cryotank 120 is an inner vessel.

Referring to FIG. 1, in some embodiments, the first module 100 comprises a first supporting frame 150 at a first end and connected with the first outer vessel wall 110. The cryotank 120 is fixed onto the first supporting frame 150 through a fixing support 130.

Figure 3:
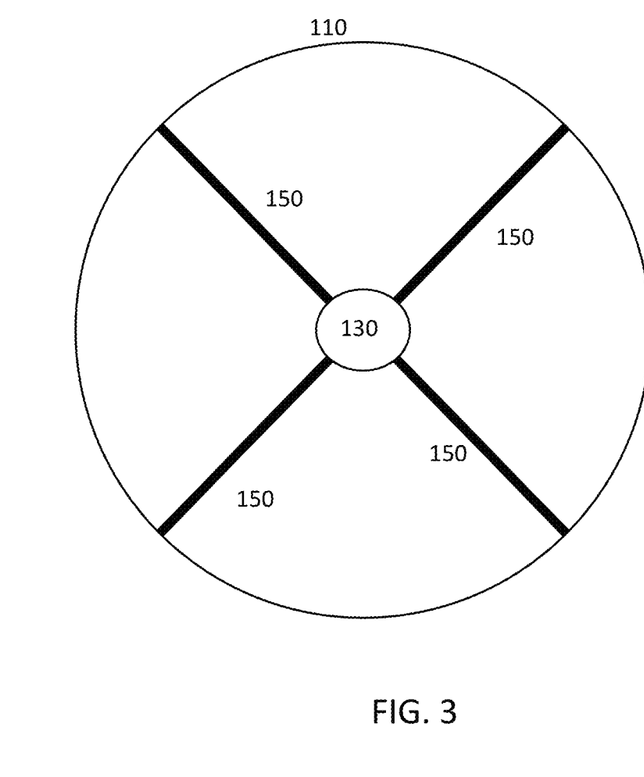
FIG. 3 is a cross sectional view illustrating an exemplary supporting frame in the system of FIG. 1. The cross section is vertical along a second direction (transverse direction), which is perpendicular to the first direction.

FIG. 3 schematically illustrates an exemplary supporting frame 150. The cross section of FIG. 3 is vertical along a transverse direction, which is perpendicular or substantially perpendicular to the longitudinal direction. The support frame 150 has radial structural members and is connected with the outer vessel wall 110 through the radial structural members to minimize weight and to allow access to the interior of the first module 100. The open frame as shown in FIG. 3 also allows the space between the inner vessel (i.e., cryotank) 120 and outer vessel 110 of all three modules to be connected. Other suitable designs can be also used to provide support while providing access with minimum structural material use.

Figure 4:
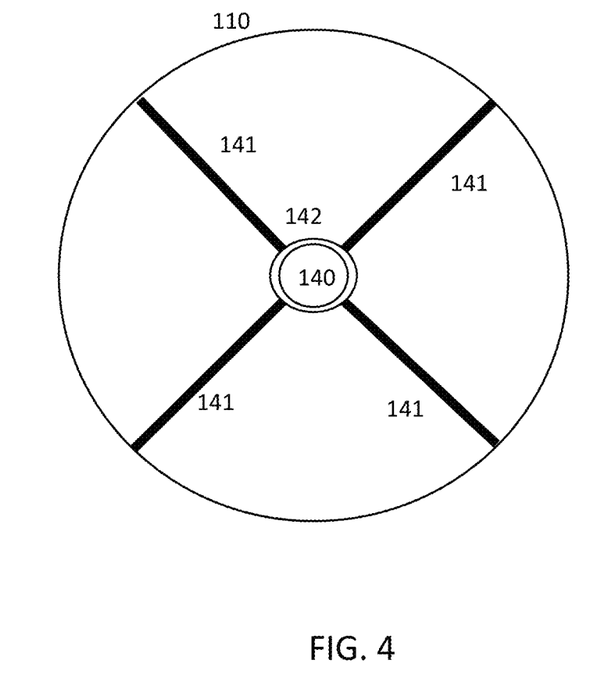
FIG. 4 is a cross sectional view illustrating an exemplary configuration having an exemplary sliding support rested in a sleeve on a supporting frame in the system of FIG. 1. The cross section is the transverse direction.

Referring to FIG. 1, the first module 100 further comprises a second supporting frame 141 on a second end and connected with the first outer vessel wall 110, a sleeve 142 in the second supporting frame 141, and a sliding support 140 connected with the first outer vessel wall 110. The sliding support 140 is also connected with the cryotank 120. The sliding support 140 is rested inside the sleeve 142 and configured to slide inside and along the sleeve 142 when the cryotank 120 is subject to thermal expansion or shrinkage. FIG. 4 illustrates an exemplary configuration having an exemplary sliding support 140 rested in a sleeve 142 on a supporting frame 141. The cross section in FIG. 4 is along the transverse direction. The supporting frame 141 also has radial structural members, which are connected to the first outer vessel wall 110. The sliding support has a circular cross-section while the sleeve 142 has a hole having a circular cross-section having slightly larger size than that of the cross-section of the sliding support 140.

The system 10 is made at ambient conditions such as room temperature, for example, 300 K. As the cryotank 120 cools from ambient temperature to operating temperature, such as liquid hydrogen at approximately 20K, the inner vessel of the cryotank 120, having an average coefficient of thermal expansion 13E-6 1/K in the temperature range from 300K to 20K, shrinks approximately by 3.6 cm over 10 m, so that the sliding support 140 is configured to accommodate such a movement.

Figure 2:
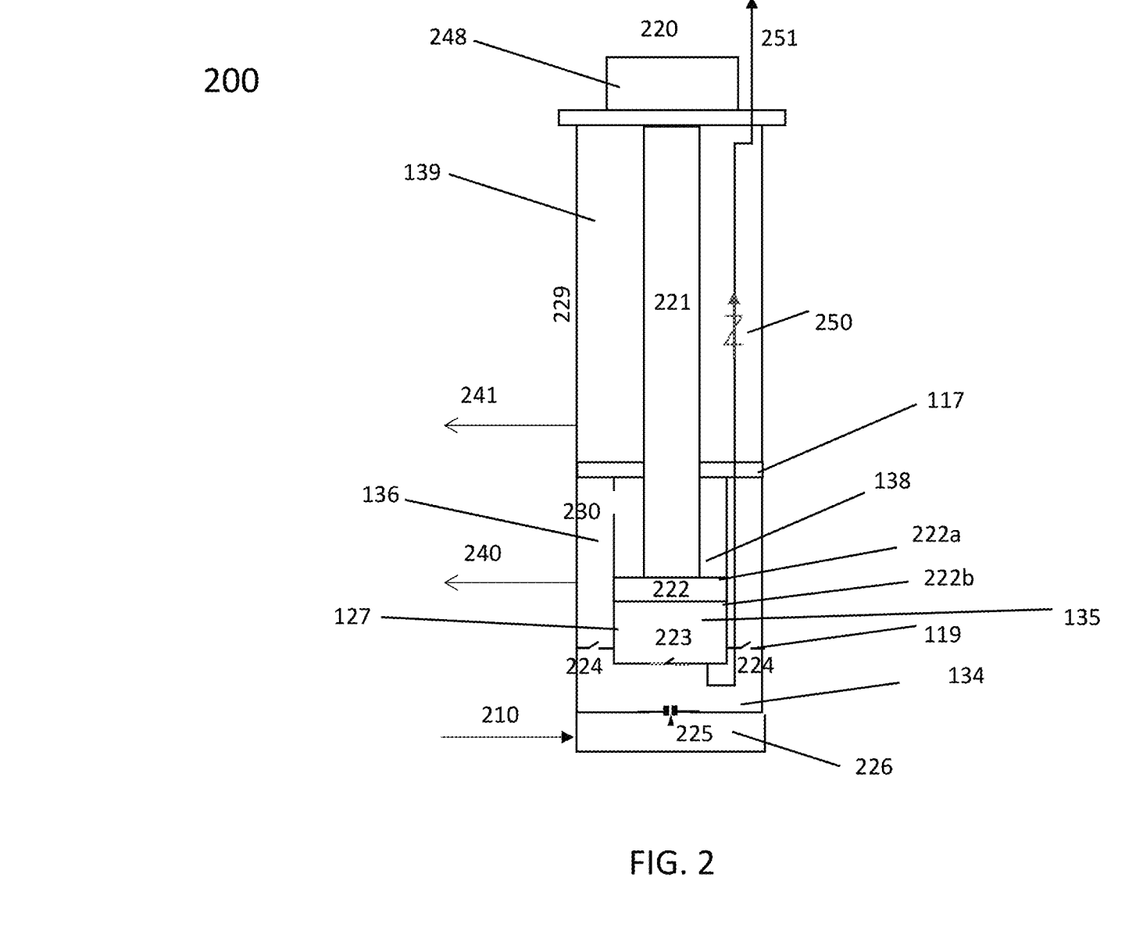
FIG. 2 is a magnified view of a portion of the second module in the exemplary system of FIG. 1 with additional reference numerals.

Referring to FIGS. 1-2, the second module 200 comprises a second outer vessel wall 270 and at least one pump 220 at least partially disposed inside the second outer vessel wall 270. The second outer vessel wall 270 may be in a shape of tube with both ends open. One end opening matches with the end opening in the first module 100. Each pump 220 configured is fluidly coupled with the cryotank 120, which is configured to provide a first stream of the liquefied fuel 14 to the pump 220 through a fluid line 210. The pump 220 is configured to accept a first stream of the liquefied fuel 14 from the cryotank 120, compress the first stream of the liquefied fuel 14 to an increased pressure, and pump it out (dispense it) as a second stream of the liquefied fuel 14. In some embodiments, each pump 220 is a submerged liquid pump, and comprises a bottom portion as a liquid reservoir 226 configured to accept the first stream of the liquefied fuel 14 through a line 210 for cooling the pump 220 and supplying the pump 220 with the liquefied fuel 14.

Referring to FIG. 1, the third module 300 comprises a third outer vessel wall 310. The third outer vessel wall 310 may have only one opening, which matches with one end opening in the second module 200. In some embodiments, the dotted line 260 in FIG. 1 is a welding seam or any other sealed connection line between the second module 200 and the third module 300, demarcating the boundaries between the two modules. Similarly, there might be a welding seal or other sealed connection line (not shown) between the first module 100 and the second module 200 near the supporting frame 150.

The first, the second, and the third outer vessel walls 110, 270, 310 are connected to provide an enclosure as an integrated outer vessel. The space between the outer vessel and an inner vessel such as the cryotank 120 and the inner portion of the at least one pump 220 is vacuumed and may be filled with insulation materials. In some embodiments, the integrated outer vessel is fully sealed. All the gap space inside the enclosure formed by outer vessel walls 110, 270, and 310, except the cryotank and the pump or other components therein, is in vacuum after the system 10 is assembled.

In some embodiments, the liquefied fuel 14 comprises hydrogen. The system 10 is for storing liquid hydrogen and/or dispensing hydrogen. The system 10 can be a part of a refueling station configured to dispense hydrogen as compressed gas into fuel cell vehicles.

Referring to FIGS. 1-2, more details of the second module 200 and the related connecting lines are described. In some embodiments, the at least one pump 220 comprises a piston rod 221, a piston 222, an intake port 134, and an isolation valve 225 configured to supply the liquefied fuel to the intake port 134. As shown in FIG. 1, the second module 200 comprises a submerged pump 220, a pipe 229 (pump housing) that houses the submerged pump 220, and a liquid reservoir 226 (or called liquid volume). The submerged pump 220 has a piston rod 221, and a piston 222.

The piston 222 may have a circular shape in some embodiments. The piston rod 221 goes through a separator 117. The piston rod 221 is connected with an external hydraulic piston 248, which may be connected with a power drive and an actuator (not shown).

In some embodiments, as shown in FIG. 2, the pump 220 further comprises a pump cylinder 127 disposed below the separator 117 and inside the pump housing 229 and is configured to accommodate the piston 222. The pump cylinder 127 is coupled with the separator 117. A side wall of the pump cylinder 127 defines a hole 230. Inside the pump cylinder 127, the space below and above the piston 222 are labelled as 135 and 138, respectively, which are pump chambers, and are configured to hold liquefied fuel (e.g., LH2) during the operation of the pump 220.

The isolation valve 225 may be actuated and control through an external actuator (not shown). One suitable example of the isolation valve 225 is disclosed in U.S. 2020/0240379, issued as U.S. Pat. No. 11,149,703. By closing the isolation valve 225, the interior components of the pump 220 and/or the pump housing 229 are isolated from the liquid reservoir 226 and the cryotank 120 with liquefied fuel so that the pump 220 can be removed without impact to the cryotank 120.

In some embodiments, the piston 222 has a front surface 222b facing an intake port 134. In the extension mode, the piston 222 moves toward the intake port 134. In the retraction mode, the piston 222 moves further away from the intake port 134.

In some embodiments, at least one check valve 224 is disposed on a supporting wall 119, which is disposed between the pump housing 229 and the pump cylinder 127. In some embodiments, a check valve 223 is disposed at the bottom wall of the pump cylinder 127. The check valves 223 and 224 open and close automatically. The check valves such as valves 223 and 224 as described herein are one-way valves.

A backside pump chamber 138 is located between the separator 117 and the piston 222 and the pump cylinder 127. Chamber 138 is fluidly connected with chamber 136 through hole 230 in the same annual space between pump cylinder 127 and the pumping housing 229. Such a backside pump chamber 138 is configured to hold liquefied fuel 14 from the hole 230 and from the check valve 224. The liquefied fuel 14 in the backside pump chamber 138 from the hole 230 may absorb dynamic heat from the pump 220, when the pump 220 works in an extension or retraction mode, and may be warmer than the liquefied fuel in the intake port 134.

In some embodiments, the second module 200 comprises: a first pipe 241 and a second pipe 240. The first pipe 241 is fluidly connected to the vapor pump chamber 139 and is configured to hold vapor of the liquefied fuel 14 in the pump 220. The second pipe 240 is fluidly connected to the first liquid pump chamber 136 and is configured to hold the liquefied fuel contacting the backside 222a of the piston 222.

The first module 100 comprises at least one block valve 243, 244 fluidly connected to the first pipe 241, the second pipe 240, and a headspace 18 of the cryotank 120. The first pipe 241 and the second pipe 240 are connected to a third pipe 245 open to the headspace 18. The first pipe 241, the second pipe 240 and the block valve 243 or 244 are configured to flow the vapor of the liquefied fuel in the pump 220 through the first pipe 241, and the liquefied fuel contacting the backside of the piston 222 through the second pipe 240, to the headspace 18 of the cryotank 120. The heat generated inside the pump 220 will be mitigated. There is no boil-off associated with using the pump or the system, or the boil-off is minimized in the system.

The first module 100 may further comprises vents or pressure relief valves 242 and 246, which are used to vent the vapor 16 of the liquefied fuel 14 in the headspace to relieve the pressure if needed.

The second module 200 further comprises a discharge line 251, which is fluidly connected with the pump 220 and is configured to dispense the compressed stream of the liquefied fuel out of the pump 220. The discharge line 251 may include a check valve 250. The discharge line 251 and the check valve 250 are inside the pump housing 229. The check valve 250 opens one-way only. When the piston 222 is extended, the second stream of liquified fuel 14 can be pumped out. The stream of the liquefied fuel may be provided to a dispenser, and dispensed into an on-board tank in a fuel-cell vehicle in some embodiments.

When the piston 222, which may be a single-stage, single-acting reciprocating cryopump, retracts in a suction stroke, isolation valve 225 and check valve 223 open while check valve 224 closes, liquid from the cryotank enters the liquid reservoir 226 through conduit 210 from the cryotank 120, and further into the intake port 134 and the pump chamber 135. Fluid from the piston back chamber 138 exits through opening 230, flows through pipe 240, valves 243 and 244 and enters the cryotank 120 tank via pipe 245 having an opening to the cryotank 120.

Purging and venting options may be provided. The pressure relief valve 246 provides the bleed option between the double-block valves 243 and 244. Line 241 provides pressure equalization between the vapor space on the upper section of the pump housing and the liquid space at the bottom section of the pump housing.

When the piston 222 extends during compression, check valve 223 closes, forcing fluid from the pump chamber 135 to exist via check valve 250 to the discharge line 251. The flow in the check valve 250 and the discharge line 251 is one directional.

Although the description and the drawing show one submerged pump 220, more than one submerged pump can be used in the same manner by expanding the pump housing module 200. The ability to modify the number of pumps without changing the liquefied gas storage module or the enclosure module is one benefit of this design.

Furthermore, although there is no sump shown or described, adding a sump is within the intent of this disclosure. For clarity, a sump is a basin on the outer vessel below the pump so that the pump can be extended below the liquefied gas storage tank. The purpose is to allow gravity to help with liquid flow from the cryotank 120 and the pump liquid reservoir 226.

Figure 5:
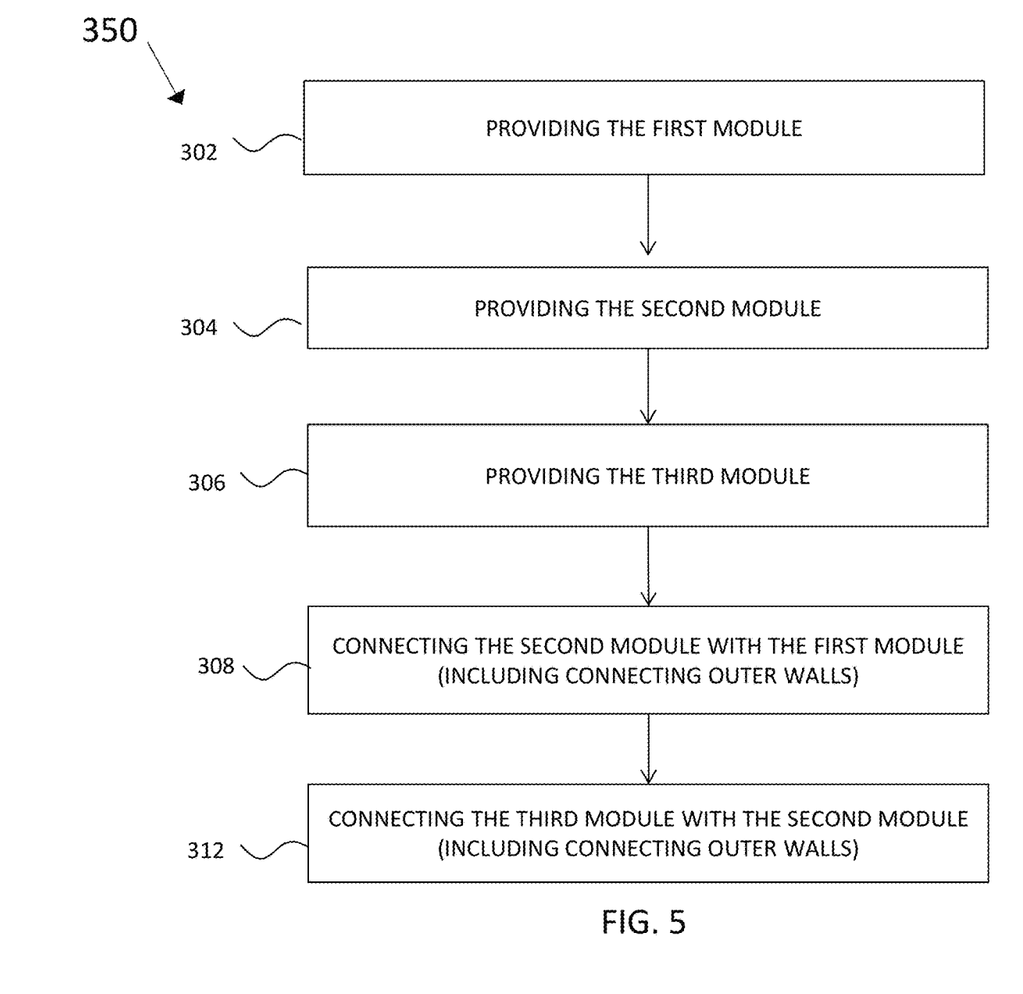
FIG. 5 is a flow chart illustrating an exemplary method in accordance with some embodiments.

In another aspect, the present disclosure also provides a method of forming the system. Referring to FIG. 5, an exemplary method 350 comprises the following steps.

At step 302, the first module 100 is provided. The first module 100 includes a cryotank 120 coupled with a first outer vessel wall 110. As described above, in some embodiments, the first module 100 comprises a first supporting frame 150 at a first end and connected with the first outer vessel wall 110, a second supporting frame 141 on a second end and connected with the first outer vessel wall 110, a sleeve 142 in the second supporting frame 141, and a sliding support 140 connected with the first outer vessel wall. The cryotank is fixed onto the first supporting frame through a fixing support, and the sliding support is rested inside the sleeve and configured to slide inside the sleeve when the cryotank is subject to thermal expansion or shrinkage. The inner tank support 130 is fixed relative to the pump housing module (the second module) 200 to minimize pipe thermal movements, especially of the pipe 210, which may has a large size in diameter.

At step 304, the second module 200 as described above is provided. The second module 200 includes at least one pump 220, which comprises a piston 222, an intake port 134, and an isolation valve 225 configured to supply the liquefied fuel to the intake port 134. The method further comprises connecting a line from the cryotank to the intake port.

At step 306, the third module 300 is provided. Each providing step may also include one or more steps for manufacturing each module or each component in each respective module.

At step 308, the second module 200 is connected with the first module 100. The first and the second outer vessel walls 110 and 270 are connected with each other, with the end opening matched.

At step 312, the third module 300 is connected with the second module 200. The third and the second outer vessel walls 270 and 310 are connected with the end openings matched to provide the enclosure as the outer vessel. The enclosure module, i.e., the third module 300 comprises a segment of the outer vessel 310. This segment is the last to be connected, for example, welded to close the cryotank system 10.

In step 308 and 310, each connecting step may include any suitable process such as welding, bonding, riveting, and other suitable methods to provide the sealed connection. In some embodiments, the first module 100, the second module 200, and the third module 300 are configured to be assembled in a longitudinal direction. The second module 200 is disposed between the first module and the third module when the system is assembled. In some embodiments, the first module 100, the second module 200, and the third module 200 are configured to be reversibly assembled and disassembled.

Figure 6:
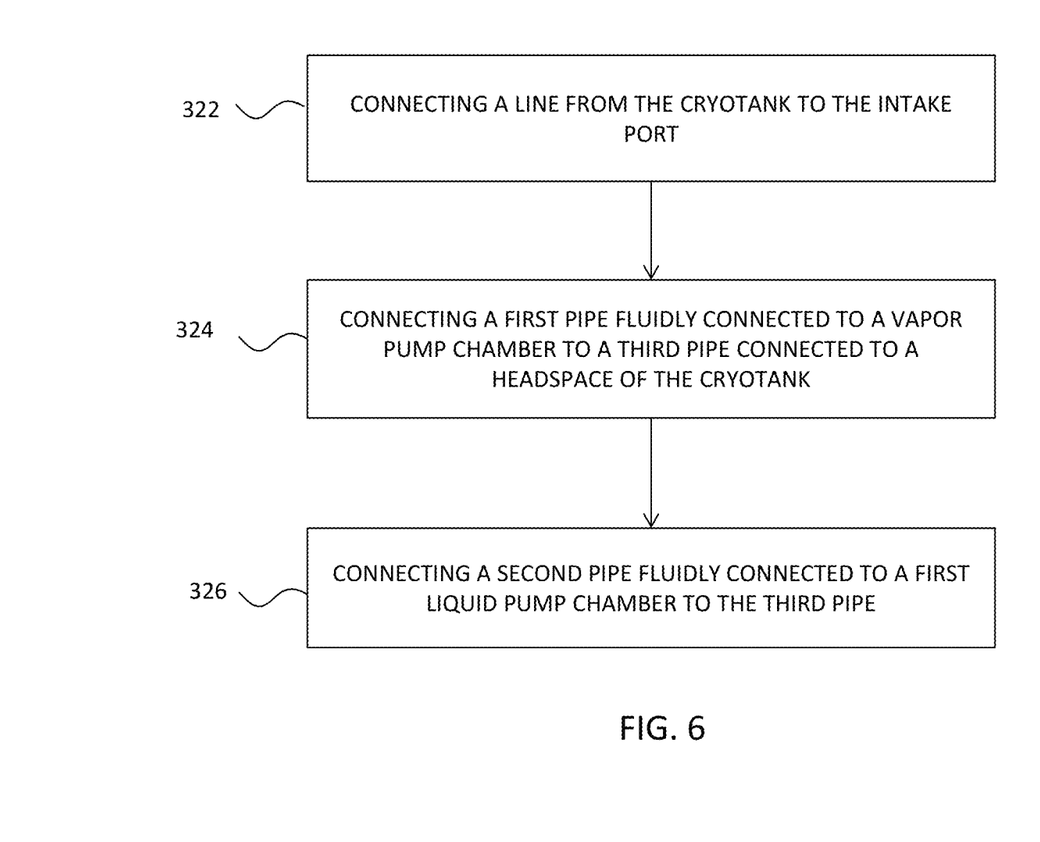
FIG. 6 is a flow chart illustrating more steps in the exemplary method of FIG. 5 in accordance with some embodiments.

Referring to FIG. 6, the exemplary method 350 may also include other connection steps. For example, steps 322, 324, and 326 may be performed before or while step 312 is performed.

At step 322, line 210 is fluidly connected from cryotank 120 to the intake port 134.

At step 324, the first pipe 241 fluidly connected to a vapor pump chamber 139 is connected to a third pipe 245 connected to a headspace 18 of the cryotank 120. The first pipe 241 can transport flow vapor of the liquefied fuel in the pump to the headspace.

At step 326, the second pipe 240 fluidly connected to a first liquid pump chamber is connected to the third pipe 245. The second pipe 240 is configured to flow the liquefied fuel contacting a backside of the piston to the cryotank.

After the system is fully assembled, the integrated outer vessel is fully sealed. The gap space inside the enclosure except the cryotank and the pump may be vacuumed.

The space between the cryotank 120 and the outer vessel 110, 270 and 310 encompasses the submerged pump and piping, and is evacuated. The cryotank 120, the pump housing pipe 229, pipe lines 240, 241 and 210, and the liquid reservoir 226 are all insulated with multi-layered insulation. Together with the vacuum, the multi-layered insulation minimizes heat leak and ensures the pump operates as if it is in fact submerged inside the cyrotank 120 with liquefied gas, thus deriving the benefits of a submerged pump.

The modular design allows the cryotank 120 as an inner vessel to be insulated and nested in a regular manufacturing process. Most of the piping 210, 240, 241 and others (not shown) such as fill ports, a safety relief system, and a level gauge are run, leaving only the connections to the pump housing open. The pump housing module (i.e. the second module) 200 is then fitted to the storage module 100 where pumping housing (pipe) 229 and liquid reservoir 226 have been insulated. The piping connections for 210, 240, 241 and others are closed. The pump 220 is installed. The enclosure module 300 is then fitted to the pump housing module 200.

The system and the method provided in the present disclosure provide many advantages as described herein. For example, in some embodiments, the present disclosure provides a system for hydrogen storage and refueling. The system in the present disclosure minimizes or eliminates losses of liquefied fuel such as hydrogen or has zero losses of hydrogen boil-off. The system with module design can be manufactured at reduced cost using readily available fabrication processes and tools.

The system provided in the present disclosure offers the following benefits.

(1) Use of readily available cryotank manufacturing processes to reduce cost.

(2) Use of submerged pumps to reduce startup time and cooldown boil-off, and to reduce maintenance because there is no thermal cycling for the pump.

(3) Modular design allows modification of the pump housing or the storage volume without impacting the other module.

In some embodiments, the liquefied fuel comprises or is hydrogen. The at least one pump comprises two or more submerged liquid pumps. The submerged pumps are cooled with the fuel from the cryotank and configured to compress and increase pressure of the first stream of the liquefied fuel to be pumped out. In some embodiments, the system is disposed in a refueling station comprising a dispenser. The refueling station is configured to receive the second stream of the liquefied fuel from the cryotank and dispense it in a form of a gaseous fuel or liquid fuel to a receiving fuel tank such as an onboard fuel tank for a vehicle.

In another aspect, the present disclosure also provides a method of using the system as described herein. For example, the system may comprise a controller configured to provide instructions and control the operation of the system.

In some embodiments, the systems provided in the present disclosure may further comprise one or more control units or a central unit for controlling the steps of the method and the fuel amount in each step or going through each component. The control unit(s) may be electronically connected with the related components in the system. The control unit may comprise one or more processors and at least one tangible, non-transitory machine readable medium encoded with one or more programs to be executed by the one or more processors.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
   a first module, the first module comprising a first outer vessel wall and a cryotank, the cryotank disposed inside the first outer vessel wall, coupled with the first outer vessel wall, and configured to store a liquefied fuel therein;
   a second module, the second module comprising a second outer vessel wall and at least one pump at least partially disposed inside the second outer vessel wall, the at least one pump fluidly coupled with the cryotank and configured to accept a first stream of the liquefied fuel from the cryotank, compress the first stream of the liquefied fuel to an increased pressure, and pump it out as a second stream of the liquefied fuel; and
   a third module comprising a third outer vessel wall,
   wherein the first, the second, and the third outer vessel walls are connected to provide an enclosure as an integrated outer vessel.

2. The system of claim 1, wherein the first module, the second module, and the third module are configured to be assembled in a longitudinal direction.

3. The system of claim 2, wherein the second module is disposed between the first module and the third module when the system is assembled.

4. The system of claim 1, wherein the first module, the second module, and the third module are configured to be reversibly assembled and disassembled.

5. The system of claim 1, wherein the liquefied fuel comprises hydrogen.

6. The system of claim 1, wherein the at least one pump is a submerged liquid pump, and comprises a bottom portion configured to accept the first stream of the liquefied fuel for cooling the pump.

7. The system of claim 1, wherein the first module comprises a first supporting frame at a first end and connected with the first outer vessel wall, wherein the cryotank is fixed onto the first supporting frame through a fixing support.

8. The system of claim 7, wherein the first module further comprises a second supporting frame on a second end and connected with the first outer vessel wall, a sleeve in the second supporting frame, and a sliding support connected with the first outer vessel wall, rested inside the sleeve and configured to slide inside the sleeve when the cryotank is subject to thermal expansion or shrinkage.

9. The system of claim 1, wherein the at least one pump comprises a piston, an intake port, and an isolation valve configured to supply the liquefied fuel to the intake port.

10. The system of claim 1, wherein the second module comprises:
    a first pipe fluidly connected to a vapor pump chamber and configured to hold vapor of the liquefied fuel in the pump; and
    a second pipe fluidly connected to a first liquid pump chamber and configured to hold the liquefied fuel contacting a backside of a piston.

11. The system of claim 10, wherein the first module comprises at least one block valve fluidly connected to the first pipe, the second pipe, and a headspace of the cryotank, and configured to flow the vapor of the liquefied fuel in the pump through the first pipe, and the liquefied fuel contacting the backside of the piston through the second pipe, to the headspace of the cryotank.

12. The system of claim 1, wherein the second module further comprises a discharge line fluidly connected with the pump and configured to dispense the second stream of the liquefied fuel out of the pump.

13. The system of claim 1, wherein the integrated outer vessel is fully sealed.

14. The system of claim 13, wherein a gap space inside the enclosure except the cryotank and the pump is in vacuum.

15. A method of forming the system of claim 1, comprising:
- providing the first module;
- providing the second module;
- providing the third module;
- connecting the second module with the first module; and
- connecting the third module with the second module.

16. The method of claim 15, wherein the connecting the second module with the first module comprises connecting the first and the second outer vessel walls; and the connecting the third module with the second module comprises connecting the third and the second outer vessel walls to provide the enclosure as the outer vessel.

17. The method of claim 15, wherein the first module comprises a first supporting frame at a first end and connected with the first outer vessel wall, a second supporting frame on a second end and connected with the first outer vessel wall, a sleeve in the second supporting frame, and a sliding support connected with the first outer vessel wall, wherein the cryotank is fixed onto the first supporting frame through a fixing support, and the sliding support is rested inside the sleeve and configured to slide inside the sleeve when the cryotank is subject to thermal expansion or shrinkage.

18. The method of claim 15, wherein the at least one pump comprises a piston, an intake port, and an isolation valve configured to supply the liquefied fuel to the intake port, the method further comprises connecting a line from the cryotank to the intake port.

19. The method of claim 15, further comprising:
- connecting a first pipe fluidly connected to a vapor pump chamber to a third pipe connected to a headspace of the cryotank;
- connecting a second pipe fluidly connected to a first liquid pump chamber to the third pipe, wherein the first pipe is configured to flow vapor of the liquefied fuel in the pump to the headspace, and the second pipe is configured to flow the liquefied fuel contacting a backside of the piston to the cryotank.

20. The method of claim 15, wherein the integrated outer vessel is fully sealed, and a gap space inside the enclosure except the cryotank and the pump is vacuumed.

* * * * *